March 20, 1928.
W. F. BOAST
RULE
Filed May 21, 1925
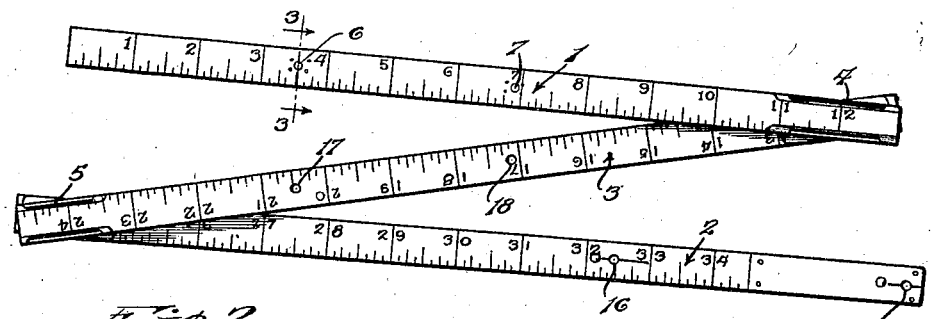
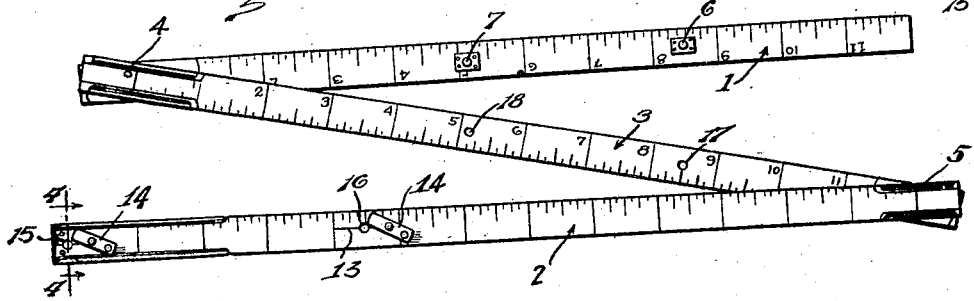
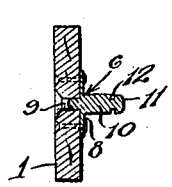
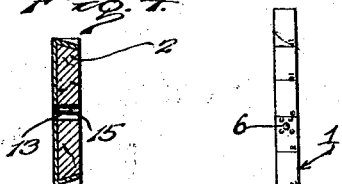
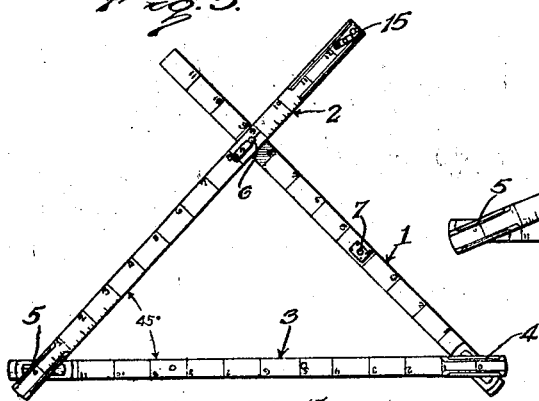
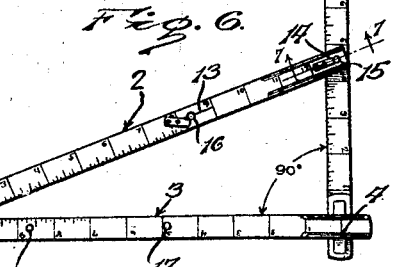
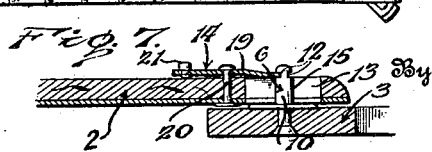
Inventor
W. F. Boast
Attorneys Patented Mar. 20, 1928.

1,663,190

UNITED STATES PATENT OFFICE.

WILLIAM F. BOAST, OF CASPER, WYOMING.

RULE.

Application filed May 21, 1925. Serial No. 31,883.

This invention relates to improvements in sectional rules such as are employed by carpenters, and the general object of the invention is to provide a rule of this type embodying means whereby it may be employed not only as a rule but also as a square and miter square, thus enabling the user to obtain all necessary linear measurements and angular measurements by the use of a single instrument.

Another object of the invention is to so construct the rule that the means which is provided for holding the several sections thereof in different positions of relative angular adjustment will constitute also a means for holding the sections in folded relation to each other.

In the accompanying drawings:

Figure 1 is a plan view of the rule embodying the invention, looking at one side thereof.

Figure 2 is a similar view looking at the other side of the rule.

Figure 3 is a detail transverse sectional view taken substantially on the line 3—3 of Figure 1, looking in the direction indicated by the arrows.

Figure 4 is a similar view on the line 4—4 of Figure 2, looking in the direction indicated by the arrows.

Figure 5 is a view similar to Figures 1 and 2, illustrating the sections of the rule adjusted to adapt the rule for employment as a miter square.

Figure 6 is a similar view illustrating the sections adjusted to permit of use of the rule as a square.

Figure 7 is a detail sectional view taken substantially on the line 7—7 of Figure 6.

The rule embodying the invention comprises two end sections, one indicated in general by the numeral 1, and the other by the numeral 2, and an intermediate section indicated by the numeral 3. One end of the section 1 and one end of the section 3 are connected by a pivot joint 4 of a well known type, and one end of the section 2 and the other end of the section 3 are similarly connected, as indicated by the numeral 5, so that the three sections may be folded to overlie one another when the instrument is not in use, or they may be adjusted to assume various relative angular positions, as will be presently explained, or the sections may be extended to assume a position in alinement with one another, as the user may desire.

The section 1 of the rule is provided with two stud members indicated one by the numeral 6 and the other by the numeral 7, and each of these stud members is of the form shown in Figure 3 of the drawings, this figure illustrating particularly the stud member 6. The sections 1, 2 and 3 are of approximately the same length and the stud member 7 is located approximately midway between the ends of the section 1 and the stud member 6 is located approximately midway between the free end of the said section and the stud member 7, this arrangement having been found to be the one best adapted to the attainment of the desired result. Openings or sockets 15 and 16 are provided in the section 2 of the rule, the socket 15 being located near the free extremity of the said section and the socket 16 being located a suitable distance inwardly of said extremity of the section, and other openings or sockets 17 and 18 are provided in the intermediate portion of the section 3.

As previously stated, the stud members 6 and 7 are of counterpart construction, and as illustrated in Figure 3 of the drawings, the member comprises a small attaching plate 8 which is riveted or otherwise secured to the base of the section 1 and may likewise be provided with a rivet projection 9 fitted through an opening in the said section of the rule and headed as shown in Figure 3 and likewise in Figure 7. The stud member proper is indicated by the numeral 10 and the same projects from the outer face of the plate 8 at the center thereof and is rounded at its outer end as at 11 and formed with a notch indicated by the numeral 12. The rounded end 11 of the stud is of slightly less diameter than the opening or socket into which it is fitted and which may be either the opening or socket 15 or 16, depending upon the manner in which the sections of the rule are arranged. The body of the stud, however, is of slightly greater diameter than the opening or, in other words, of such diameter that it will fit snugly in the opening, and in order that this may be accomplished without binding of the stud so that it can be readily engaged and disengaged, the section 2 of the rule is formed with short longitudinally extending slits 13 which are radial to the respective openings or sockets 15 and 16 and which permit of slight expansion of the section at the point of location of each socket. In order to prevent accidental separation of the sections when they have been adjusted to either of the positions shown in Figures 5 and 6 of the drawings, a locking member 14 is mounted upon the section 2 engaging each of the openings 15 and 16 and comprises a thin strip 19 of metal swiveled as at 20 upon the said section 2, and adapted to be rotated about the swivel pin 20 to bring one of its ends into engagement in the notch 12 in the stud 10, a finger button 21 being preferably provided at the other end of the said strip whereby it may be conveniently rotated about the swivel 20 and thus brought into and out of engagement in the notch in the stud. Of course, when the end of the member 19 is engaged in the notch, the stud will be securely held against withdrawal from the opening 15 or 16, as the case may be.

It will be understood, of course, that the rule may be employed in the usual manner as a rule, and it will be observed by reference to Figures 5 and 6 of the drawings, that it may also be employed as a miter square or a right angle square. In adapting the rule to be employed as a miter square, as shown in Figure 5, the sections of the rule are relatively angularly adjusted to the position illustrated in the said figure and the stud 6 is engaged in the socket 16 in the section 2, at which time, the sections 1 and 2 will assume a position at an angle of 45° to the section 3. In adapting the rule for use as an ordinary square, the sections are relatively angularly adjusted to assume the relationship shown in Figure 6 of the drawings, and the stud 7 is engaged in the socket 15 of the section 2, so that in this position of the parts the section 1 will extend at right angles to the section 3 and be held in place in this position by the section 2.

As illustrated in Figure 2 of the drawings, it is preferable that each section of the rule bear a linear scale, upon one side, representing twelve inches divided into inches and fractions of inches, so that when the instrument is employed as a square or miter square, any one side of the triangle formed by the several sections may be employed in making measurements as well as determining angles. The other sides of the rule sections may be provided with linear scales and preferably, in this instance, the entire scale will represent one linear yard and will embrace divisions representing inches and fractions of inches.

When the sections are folded, the studs 6 and 7 will engage respectively in the sockets 17 and 18 and thus the sections 1 and 3 will be held against relative separation.

Having thus described the invention, what I claim is:

1. An instrument of the class described comprising end and intermediate sections, the end sections being each pivotally connected at one end to a respective end of the intermediate section whereby the sections may be relatively angularly adjusted, one of the end sections having an opening therein and being formed with slits extending radially in opposite directions from the opening whereby to permit of expansion of the opening, and means for holding the sections in a definite position of angular adjustment comprising a stud carried by the other end section and engageable in the said opening and having an entering end of less diameter than the opening, the body of the stud being of a diameter slightly greater than that of the opening whereby to provide for a tight fitting of the stud in the opening to prevent disarrangement of the sections when adjusted.

2. An instrument of the class described comprising end and intermediate sections, the end sections being each pivotally connected at one end to a respective end of the intermediate section whereby the sections may be relatively angularly adjusted, one of the end sections having an opening therein, a stud upon the other end section engageable in the opening and having a notched projecting end portion to project beyond the opening, the engagement of the stud in the opening serving to hold the several sections in a definite position of angular adjustment, and means for restraining the stud from disengagement from the opening comprising a locking member swiveled intermediate its ends upon the first mentioned end section at one side of the opening therein and engageable at one end in the notch in the stud and provided at its other end with a finger piece whereby it may be adjusted into and out of locking engagement with the stud.

In testimony whereof I affix my signature.

WILLIAM F. BOAST. [L. S.]